United States Patent [19]

Pickles

[11] 4,209,158
[45] Jun. 24, 1980

[54] SEAT ADJUSTER

[75] Inventor: Joseph Pickles, Birmingham, Mich.

[73] Assignee: Ferro Manufacturing Corporation, Detroit, Mich.

[21] Appl. No.: 877,880

[22] Filed: Feb. 15, 1978

[51] Int. Cl.² .......................................... F16M 13/00
[52] U.S. Cl. .................................... 248/421; 297/346
[58] Field of Search ............... 248/421, 608, 423, 419, 248/591; 297/345, 346

[56] References Cited

U.S. PATENT DOCUMENTS

| | | | |
|---|---|---|---|
| 3,137,473 | 6/1964 | Augunas | 248/423 X |
| 3,149,815 | 9/1964 | Cotter et al. | 248/421 |
| 3,269,687 | 8/1966 | Pickles | 248/419 X |
| 4,043,529 | 8/1977 | Pickles | 248/419 |
| 4,128,225 | 12/1978 | Kluting et al. | 248/421 |

FOREIGN PATENT DOCUMENTS 1170722 11/1969 United Kingdom ..................... 297/345

Primary Examiner—Robert W. Gibson
Attorney, Agent, or Firm—Whittemore, Hulbert & Belknap

[57] ABSTRACT

A manually operated seat adjuster for moving a vehicle seat upwardly and forwardly or rearwardly and downwardly and maintaining the seat in intermediate adjusted position. Seat movement is accomplished by front and rear lift levers interconnected by a link. A manually movable operating lever is pivoted to the lift link, has a mechanical connection to one of the operating levers and includes a pin selectively locking the lift lever in adjusted position by engagement with one of a series of openings in the lever.

41 Claims, 8 Drawing Figures

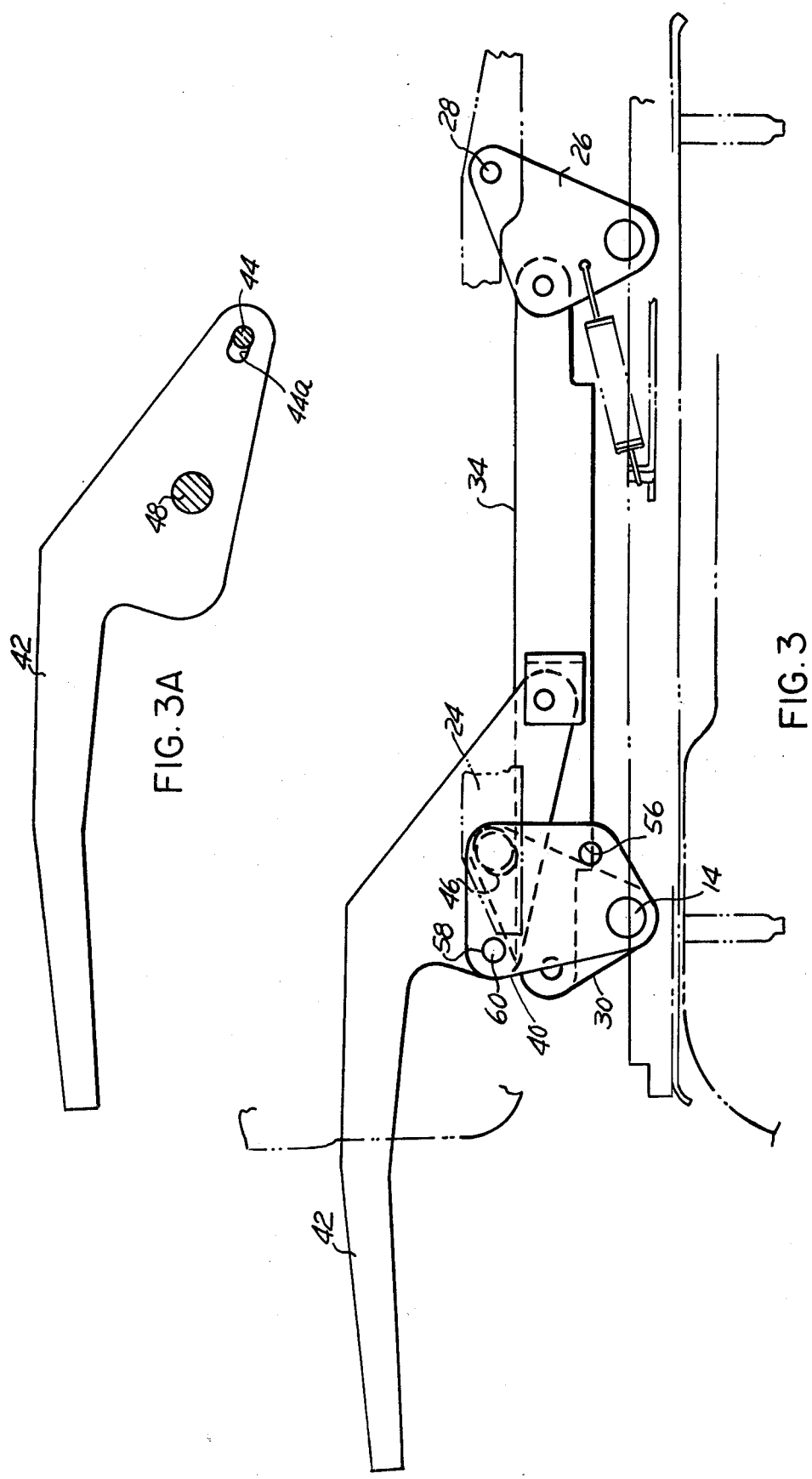

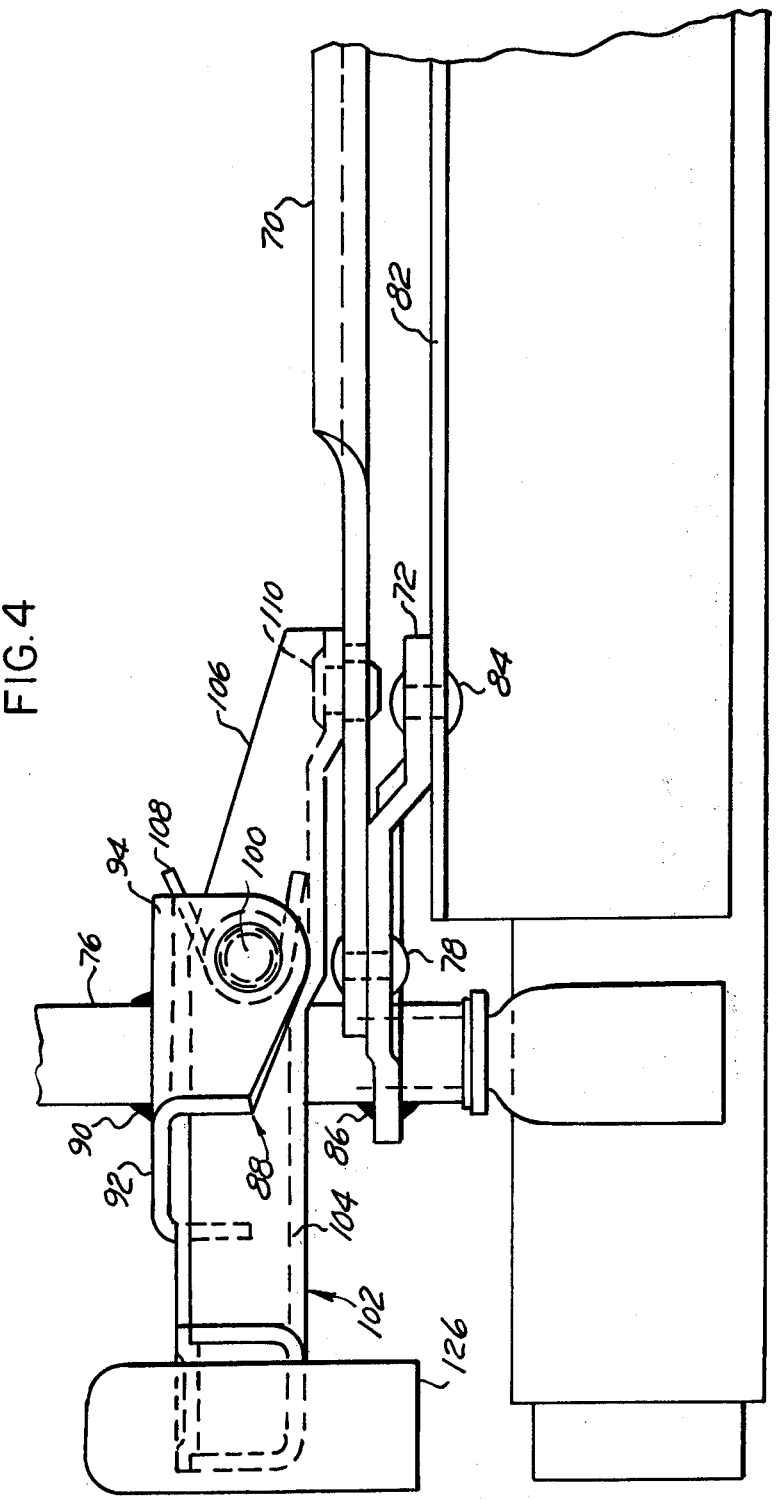

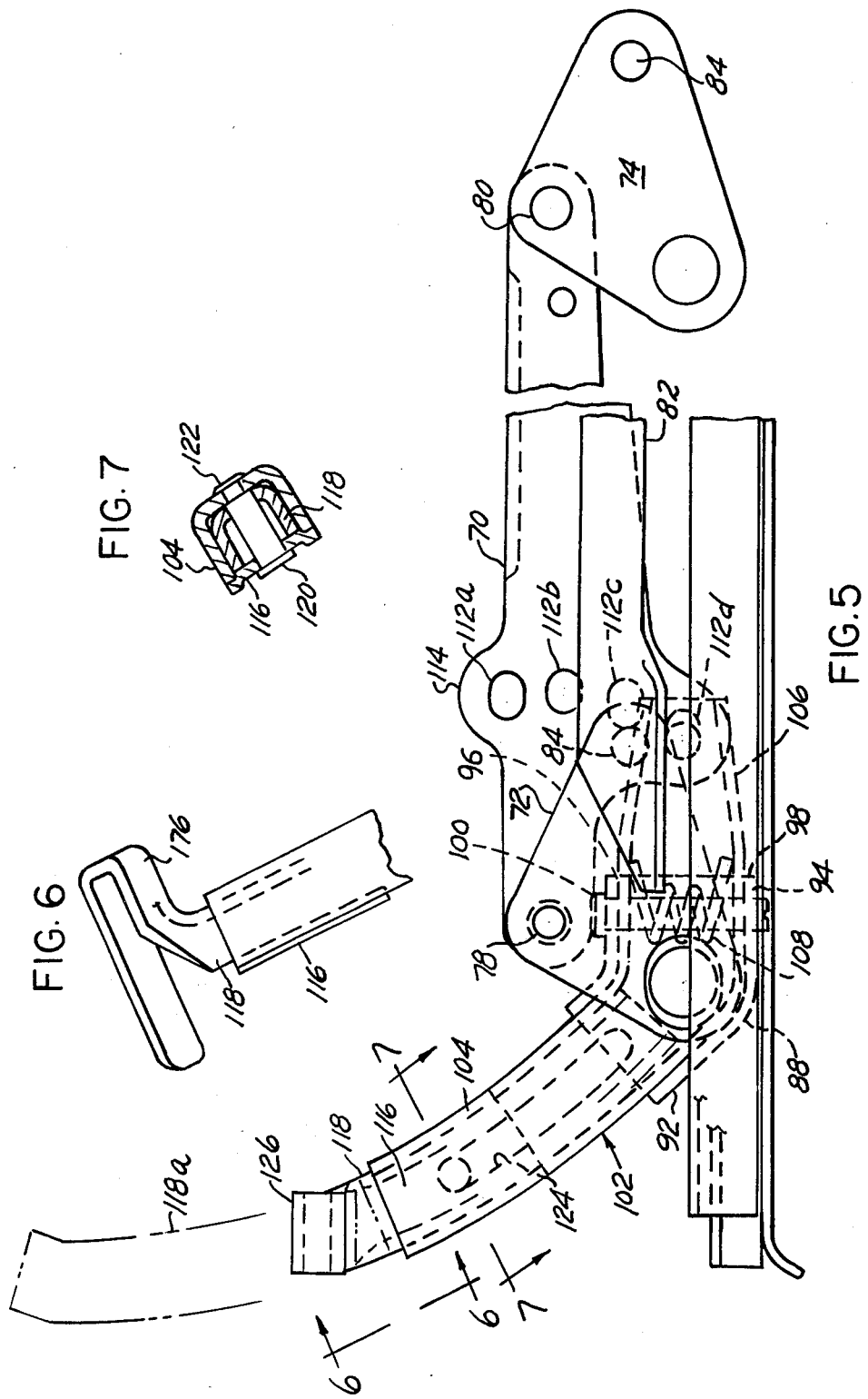

SEAT ADJUSTER

BRIEF SUMMARY OF THE INVENTION

The invention relates to a seat construction for an automobile in which opposite ends of the seat are mounted on lift levers at the corners thereof which are adapted to swing upwardly and forwardly so as to provide adjustment between two limiting positions. This construction may if desired be mounted on generally horizontal movable slides to provide for fore and aft adjustment of the seat in addition to the adjustment provided by the pivoted mounting thereof.

A manually movable operating lever is provided at one side of the seat, as for example at the left of the operator's position. This lever is pivoted to a link which connects the front and rear lift lever or lever means at the corners of the seat or a seat supporting frame.

The operating lever is preferably in the form of a flat elongated bar which has limited lateral flexibility. The operating lever is operatively connected to one of the seat mounted lift levers so that as the operating lever is raised, the lift lever to which it is connected is pivoted to cause upward and forward adjustment of the seat frame.

It will be appreciated that operatively interconnected lift levers are provided adjacent to each corner of the seat support so that the seat is mounted in the level position in all adjustments thereout.

The seat mounting lift levers are generally in the form of flat plates and the lever means adjacent the operating lever comprises a pair of closely adjacent laterally spaced substantially flat plates, one of which is identical with the seat mounting lift levers at the other three corners of the seat supporting frame. The lift lever means adjacent the operating lever includes a second latch lever fixed to and pivoted co-axially with the adjacent lever and including means for interlocking with the operating lever to fix the seat in adjusted position.

The operating lever is positioned between the pair of adjacent levers comprising one lift lever means and includes a slightly elongated opening through which extends an actuating pin or shaft which is connected at its ends to the pair of laterally spaced levers.

The means for selectively interlocking the operating levers in adjusting positions comprises a pin on the operating lever movable by a lateral deflection of the operating lever into and out of the selected openings in the adjacent latch lever.

BRIEF DESCRIPTION OF THE DRAWINGS

FIG. 3 is a view similar to FIG. 2 showing the parts in a different position of adjustment.

FIG. 3A is a detail view of a modified operating lever.

FIG. 4 is a fragmentary plan view of a further embodiment of the present invention.

FIG. 5 is an elevational view of the structure shown in FIG. 4.

FIG. 6 is a fragmentary view taken from the line 6—6 in FIG. 5.

FIG. 7 is a sectional view on the line 7—7 in FIG. 5.

DETAILED DESCRIPTION

Figure 1:
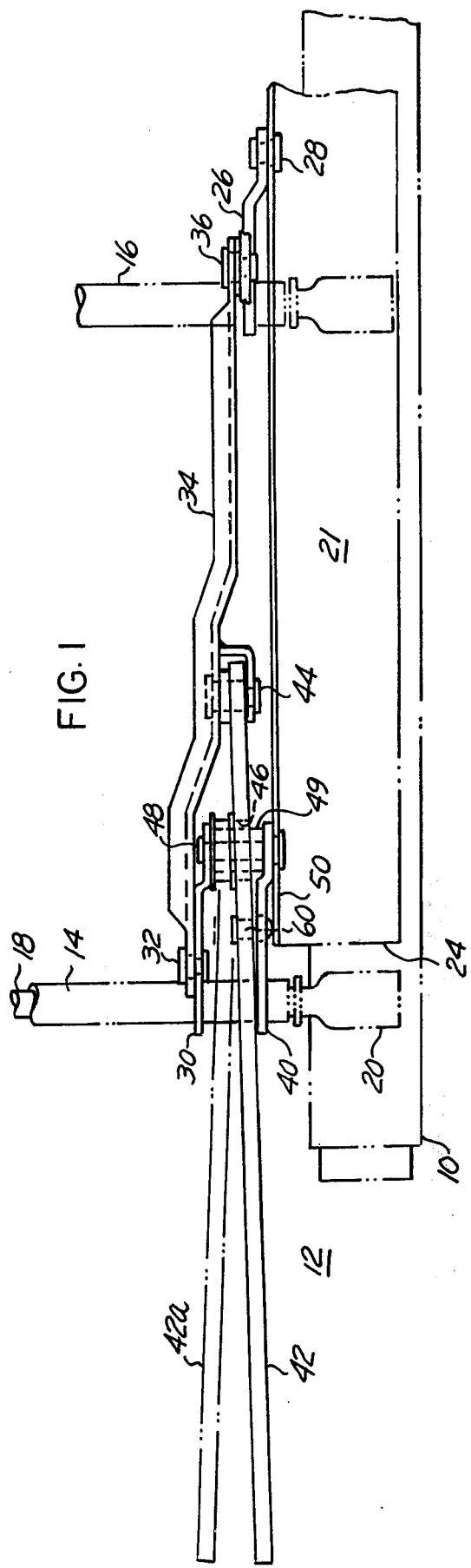
FIG. 1 is the plan view of the seat adjusting mechanism on one side of the seat.

The adjustable vehicle seat construction is mounted on mounting members preferably in the form of seat slides 10 at opposite ends of the seat movable horizontally on stationary supports 12 extending longitudinally of the vehicle. At opposite ends of the seat slides 10 are torsion tubes 14 and 16 which are mounted for rotation on shafts 18 having flattened end portions 20 welded or otherwise suitably secured to the slides. Shafts 18 provide stationary pivot supports for the tubes 14 and 16 which latter insure equal angular movement to said seat adjusting mechanisms presently to be described. Similar seat adjusting mechanism is provided at the front and rear corner of the seat and this mechanism is connected by rigid links as will subsequently be described. Accordingly, identical adjustment is provided for each of the four seat corners.

Figure 2:
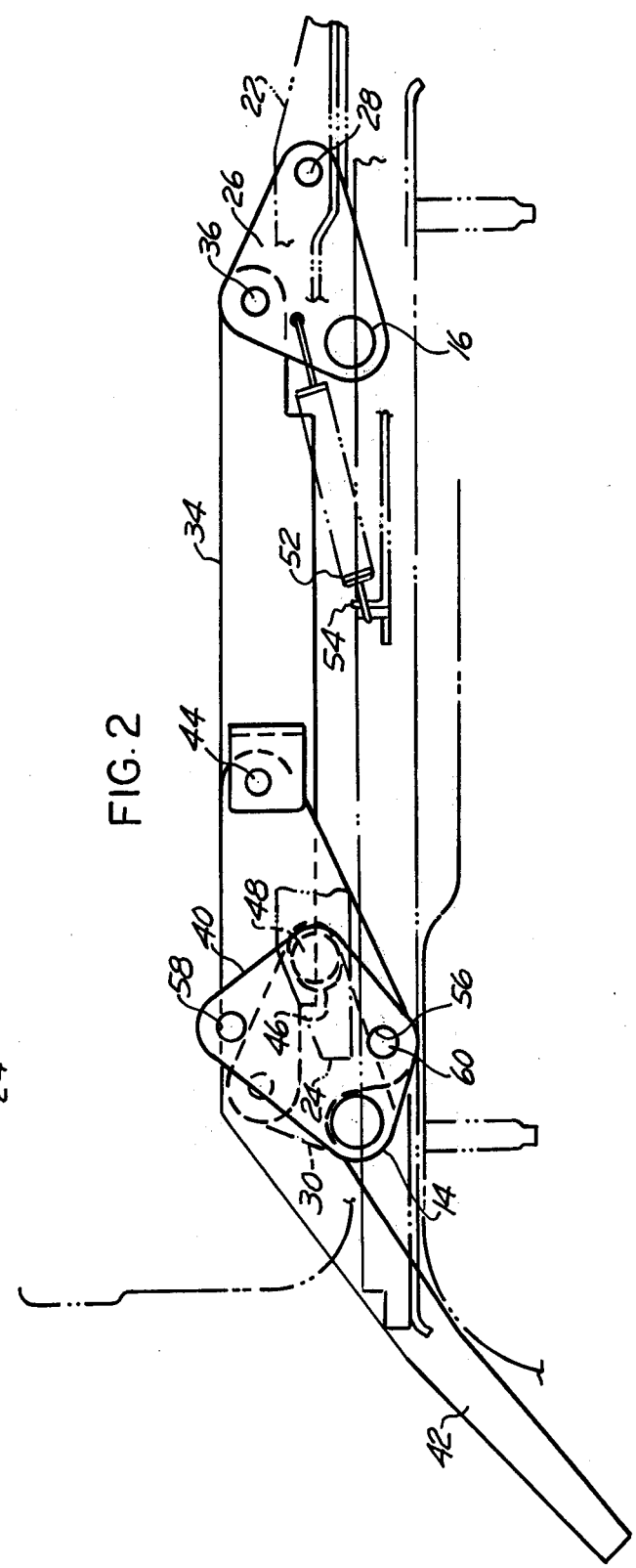
FIG. 2 is an elevational view of the structure shown in FIG. 1.

A rigid seat supporting frame 21 is provided, a rear corner of which is indicated at 22 in one position of adjustment and the front corner in the same position of adjustment is indicated at 24 in FIG. 2. A rear seat supporting lift lever 26 is provided which is fixedly secured to the rear torsion tube 16 and has a pivot connection 28 adjacent the corner 22 of the seat supporting frame 21. A functionally identically shaped front lift lever 30 is provided adjacent the front of the seat construction and is fixed to the front torsion tube 14. It will be understood that seat supporting lift levers are provided at the opposite ends of torsion tubes 14 and 16 and which therefore have identical pivoting movement with the lever 30.

The front lift lever 30 has a pivot 32 with a rigid link 34 which in turn is pivoted at 36 to the rear seat supporting lift lever 26 so that the levers 26 and 30 have identical pivoting movement.

Laterally spaced from front lift lever 30 is a generally similar seat supporting and locking lever 40 which is also fixedly connected to the transverse torsion tube 14. Levers 30 and 40 may be considered as together constituting a single lift lever means.

A manually movable operating lever 42 is pivoted to an intermediate portion of the link 34 as indicated at 44, the manual lever 42 having a slightly elongated opening 46 for the reception of a pin 48 secured at its opposite ends in suitable openings in the levers 30, 40 and carrying a bushing 49 which is movable in the slot 46. The pin 48, as best seen in FIG. 1, extends beyond the lever 40 to provide a pivot connection with the flange 50 on the seat supporting frame member 21.

A tension spring 52 is connected as shown between spring support 54 and the seat supporting lever 26 to apply a force tending to move all of the seat supporting lift levers counterclockwise. As will be obvious, the strength of the spring 52 may be selected so as to balance a predetermined portion of the anticipated weight of the seat and occupants thereof, so as to minimize the force required to move the operating lever 42 to seat elevated position.

The seat supporting lift and locking lever 40 is provided with openings 56 and 58. The manually movable operating lever 42 is provided with a headed pin 60 which may be withdrawn from the opening 56, as indicated in FIG. 1, by a lateral displacement of lever 42 to the dotted line position 42a as indicated in FIG. 1. With the pin 60 received in the opening 56 as illustrated in FIG. 2 it will be appreciated that the movable parts of the seat supporting structure are maintained in fixed position. The lever 42 is movable about pivot 44 whereas the seat supporting and locking lever 40 is movable about the axis of tube 14. Accordingly, with the parts in the locked position indicated in full lines in FIG. 1, movement of the lever 42 would move the opening 56 and pin 50 in different directions and is accordingly prevented.

In order to swing the levers 30 and 40 counterclockwise to impart corresponding movement to lift lever 26 and the corresponding lift levers at the opposite end of the seat, the pin 48 and bushing 49 are moved upwardly in an arc about the axis of torsion tube 14 by engagement with the sides of the slot 46 provided in the manually movable operating lever 42. This upward movement of the operating lever 42 from the position shown in FIG. 2 to the position shown in FIG. 3 results in counterclockwise movement of the levers 26, 30, and 40 to the position shown in FIG. 3 which in turn lifts the pivot connection 28 and the pivot connection between the pin 48 and the front portion 24 of seat support element 21 to the elevated and forwardly displaced position illustrated in FIG. 3. This movement as previously described is assisted by the tension spring 52.

In order to maintain the parts in the position in FIG. 3 when the operating lever 42 is released to permit lateral movement thereof, the lift and locking lever 40 will have moved to a position such that opening 58 thereof is in position to receive the end of locking pin 60. It will of course be understood that intermediate the openings 56 and 58, any desired number of similar openings may be provided to receive the locking pin 60 with the seat in intermediate adjusted positions. Illustrations of these openings in the lift and locking lever 40 is omitted for clarity. As seen in FIG. 3A, it is sometimes preferred to pivot lever 42 at pin 48, and provide a pin and slot connection with pin 44, by providing slot 44a as shown.

Referring now to FIGS. 4 through 7 there is illustrated a somewhat different and preferred embodiment of the present invention. Parts not specifically described in connection with these figures will be understood to correspond to parts shown in FIGS. 1 through 3.

In the further embodiment of the present invention the rigid link 70 is connected at its ends to the front lift lever 72 and the rear lift lever 74 which are pivoted to transverse extending torsion bars as in the previously described embodiment. In FIG. 4 a portion of the front torsion bar is indicated at 76. The front end of the link 70 is connected to the front lift lever by a pivot connection 78 and the rear end of the link is connected to the rear lift lever 74 by a pivot connection located at 80. The lift levers are suitably connected to longitudinally extending seat support frame bars 82 as indicated at 84.

The front lift lever 72 is fixedly connected to torsion tube 76 by suitable means such for example as the weld connection indicated at 86. It will be appreciated that the front lift lever at the opposite side of the seat construction is similarly connected to the torsion tube. Accordingly a rotation of the front torsion tube rotates both front lift levers and this operates the rear lift levers through the link mechanism as described.

In this embodiment of the invention the manually operated means for effecting adjustment of the seat comprises a bracket 88 fixedly welded to the front torsion tube 76 as indicated at 90. The bracket 88 in the full line position of FIG. 4 has a relatively short arm 92 which extends forwardly and upwardly, and a rearwardly extending arm 94. Arms 92 and 94 as best seen in FIG. 4 are of U-shaped cross section. The upper and lower flanges of the rear section 94 are shown at 96 and 98. The flanges 96 and 98 are apertured as best seen in FIG. 5 and receive a pivot pin 100. Partly received within the bracket 88 and pivoted relative thereto by the pivot pin 100 is a lever indicated generally at 102 and having in the full line position shown in FIG. 5 an upwardly and forwardly extending operating lever arm 104 and a rearwardly extending arm 106. A coil torsion spring 108 surrounds the pin 100 and, acting between the rearwardly extending arm 94 of the bracket and the rearwardly extending arm 106 of the lever biases the lever 102 clockwise as seen in FIG. 4. The rearwardly extending arm 106 of the lever 102 carries a pin 110 which is adapted to be received in one of a plurality of openings 112a, 112b, 112c and 112d provided in a transverse enlargement 114 of the link 70. It will be apparent that when the pin 110 is received in any one of the openings 112, the lever 102 is locked against rocking movement about the axes of the torsion tube 76 and accordingly the seat will be maintained in whatever position it occupies.

The operating lever arm 104 of the lever 102 is also of U-shaped cross-section as best seen in FIG. 7 and adjacent its forward end is provided with a fixed cover plate 116. It will be observed in FIG. 5 that the arm 104 is slightly curved, and slidably received in the arm 104 is an arm extension 118. The arm extension 118 is also of U-shaped cross-section and has a curvature conforming to that of operating lever arm 104 of the lever 102 as best seen in FIG. 7. Extending between the cover plate 116 and the bottom wall of the arm 104 is a pin 120 which is headed at one end and which is riveted as indicated at 122 at its opposite end to retain it fixedly in the lever 104. The arm extension 118 is provided with an elongated slot 124 through which the pin 120 passes, the pin providing a stop which permits movement of the arm extension from the full line position shown in FIG. 5 to an operating position indicated by the dot and dash lines at 118a. The outer end of the arm extension 118 is twisted and shaped as illustrated to provide a handle portion 126. It will be understood that when the seat adjusting mechanism is idle, the operating arm extension 118 is almost completely housed in lever arm 104. However, when the seat is to be moved, the driver moves the handle portion 126 outwardly to provide increased leverage at which time the arm extension 118 together with the lever 102 may first be pivoted about the axis of the pin 100 against the bias of the spring 108 to withdraw the locking pin 110 from whatever opening 112 it occupies, after which the arm extension 118 together with the lever 102 and bracket 88 are rotated about the axis of the torsion tube 76, rotating the torsion tube and hence providing the desired angular movement of the lift levers 72 and 74. When the seat has been moved to the desired position the operator permits the spring 108 to restore the locking pin 110 to a selected opening 112, after which he shifts the operating arm extension 118 to the full line position of FIGS. 5 and 6, in which it is substantially housed within lever arm 104.

The foregoing construction permits the driver of the vehicle to move the seat upwardly by downward pressure applied to the handle 126. Thus the weight of the driver is in part applied to reduce the weight of the driver on the seat and requires less effort to move the seat to its upper adjusted position.

The present invention is an improvement over my prior U.S. Pat. No. 4,043,529 to which reference is made for details not described herein.

What is claimed is:

1. A manually adjustable seat construction for a vehicle comprising a pair of elongated horizontal, parallel, longitudinally spaced, transversely extending rotatable torsion bars, lift lever means fixed to the ends of said bars, a rigid link pivotally connected at its end to the lift lever means at the same side of said construction, a seat support connected to said lift lever means for movement thereby between elevated and lowered position, a manual operating lever having a handle portion, said operating lever being pivoted to said seat construction for angular movement about a transverse axis in a plane perpendicular to said axis and having an operative connection to one of said lift lever means, and latch means comprising latching elements movable into and out of latching engagement by movement of said handle portion laterally of the said plane of its said angular movement for fixing said operating lever in different positions of angular adjustment to retain the seat support in corresponding different positions of adjustment.

2. A seat construction as defined in claim 1, in which said operating lever is pivoted to said link.

3. A seat construction as defined in claim 1, in which said operating lever and said one lever means comprise flat vertical plate portions relatively movable to each other in a direction parallel to said plate, portions and the means for fixing the operating lever comprises a co-operating abutment and plurality of abutment receiving openings acting between said operating lever and said one lever means.

4. A seat construction as defined in claim 3, in which said manual operating lever is laterally deflectable to release said abutment from said openings.

5. A seat construction as defined in claim 1, in which said operating lever is in the form of elongated flat member manually pivotally movable in its plane, whereby to exhibit adequate operating stiffness, an abutment and abutment receiving latch means operating between said operating lever and another member of said seat construction movable in different directions upon operation of said operating lever, said operating lever being laterally deflectable to release said latch means preparatory to moving said operating lever to a different position of adjustment.

6. A seat construction as defined in claim 5, in which said latch means is provided to act between said operating lever and one of said lever means.

7. A seat construction as defined in claim 6, in which said abutment is provided on said operating lever, and said abutment receiving openings are provided on said one lever means.

8. A seat construction as defined in claim 1, in which the lever means having operating engagement with said operating lever is one of a pair of flat laterally spaced, identically movable levers, said operating lever having a portion disposed between said pair of levers, an elongated opening in said operating lever, a pin fixed at its ends to said pair of levers and extending through said elongated opening to provide for pivoting of all of said lever means upon pivoting of said operating lever.

9. A seat construction as defined in claim 8, in which said pin extends beyond one of said pair of levers and is pivotally connected to said seat support.

10. A seat construction as defined in claim 8, in which one of said pair of laterally spaced lift levers has a plurality of latch openings therein, and said operating lever has a laterally projecting pin receivable in a selected one of said openings.

11. A seat construction as defined in claim 10, in which all of said lift lever means are fixed to said torsion bars extending between opposite sides of said seat construction.

12. A seat construction as defined in claim 10, in which said operating lever is an elongated flat member rigid in its own plane but resiliently flexible laterally at said plane to provide for latching and unlatching deflection thereof.

13. A manually adjustable vehicle seat construction comprising a pair of transversely extending longitudinally spaced horizontal torsion bars, lift levers fixed to the ends of said bars, seat supporting frame members pivotally connected to extend between the lift levers at corresponding ends of said bars, a manual operating lever pivoted to said seat construction for pivotal movement about a horizontal axis spaced substantially from one of said torsion bars and having a portion adjacent and movable relative to the one of said lift levers adjacent said manual operating lever, means operably interconnecting said manual operating lever and said one lift lever to provide pivoting of said one lift lever about the axis of the torsion bar to which it is fixed upon pivoting movement of said manual operating lever, means for interconnecting all of the lift levers for identical pivotal movement about the axes of said torsion bars, and selectively engageable lock means operating between said manual operating lever and said one lift lever.

14. A seat construction as defined in claim 13, in which said manual operating lever is formed of elongated flat plate material which is rigid in its own plane but laterally deflectable, and said lock means comprises pin and pin-receiving openings provided in said manual operating lever and said one lift lever.

15. A seat construction as defined in claim 14, in which the pin of said pin and pin-receiving openings is provided on said manual operating lever, and the pin-receiving openings are provided in said one lift lever.

16. A seat construction as defined in claim 13, in which the means for interconnecting the lift levers at the corresponding ends of said torsion bars comprises a fifth lever slightly spaced from said one lift lever and fixed to the torsion bar to which said one lift lever is fixed, and a rigid link pivoted at its ends to said fifth lever and the lift lever fixed to the corresponding end of said other torsion bar.

17. A seat construction as defined in claim 13, in which the means operably connecting said manual operating lever and said one lift lever comprises a slot in said manual operating lever, a pin extending through said slot and secured adjacent its ends to said one lift lever and said fifth lever.

18. A seat construction as defined in claim 17, in which said pin is pivotally connected to the end of the adjacent seat supporting frame member to provide the pivotal connection between said one lift member and the adjacent seat supporting frame member.

19. A seat construction as defined in claim 1, in which said operating lever is connected to the forward one of said torsion bars to be directly movable therewith about the axis of said bar.

20. A seat construction as defined in claim 19, in which the means connecting said operating lever to said one torsion bar comprises a bracket fixed to said bar, pivot means connecting said operating lever to said bracket to provide for positive movement of said bar about its axis by corresponding movement of said operating lever while permitting transverse movement of said operating lever relative to said bracket, and said latch means comprises selectively engageable and disengageable means acting between said operating lever and an adjacent element of the seat construction with respect to which said operating lever is relatively movable.

21. A seat construction as defined in claim 20, in which said selectively engageable and disengageable means comprises a pin and a plurality of pin-receiving openings.

22. A seat construction as defined in claim 21, comprising spring means acting between said bracket and said operating lever biasing said lever in a direction to engage said latch means.

23. A seat construction as defined in claim 20, in which the said element of the construction with respect to which the operating lever is relatively movable is said link.

24. A seat construction as defined in claim 23, in which said selectively engageable and disengageable means comprises a pin and a plurality of pin-receiving openings.

25. A seat construction as defined in claim 24, comprising spring means acting between said bracket and said operating lever biasing said lever in a direction to engage said latch means.

26. A seat construction as defined in claim 25, in which the pin-receiving openings are provided in said link, and said pin is located at the end of a rearwardly extending latch arm of said operating lever.

27. A seat construction as defined in claim 19, in which said operating lever comprises a forwardly extending arm movable downwardly to rotate said one torsion bar in a direction to raise said seat support.

28. A seat construction as defined in claim 19, in which the forwardly extending arm of said operating lever is hollow and has a slidable extension movable between an idle position in which it is substantially received within said arm and an operating position in which it extends substantially beyond the end of said arm to provide increased mechanical advantage.

29. A seat construction as defined in claim 28, in which said operating arm is of generally U-shaped cross-section.

30. A seat construction as defined in claim 29, in which said extension is also of generally U-shaped cross section.

31. A seat construction as defined in claim 28, in which said operating arm and said extension are curved so that the free end of said extension moves forwardly and upwardly as it is drawn from said operating arm.

32. A manually adjustable vehicle seat support construction comprising a pair of elongated longitudinally extending laterally spaced mounting members, a rotatable laterally extending torque-transmitting front pivot bar carried by and extending between said support members adjacent the forward end thereof, a rear laterally extending pivot bar carried by and extending between said support members adjacent the rear ends thereof, a manually operating lever pivoted to said seat support construction at one side thereof for pivot movement about a transverse horizontal axis, a pair of front and rear lift lever means pivoted to said seat support construction for pivot movement about the axes of said front and rear pivot bars, said front lift lever means being fixed to said front pivot bar, elongated longitudinally extending seat support members at opposite sides of said construction having the ends thereof pivotally connected to the pair of lift lever means at the same side of said construction, connections between said operating lever and the front lift lever means at the same side of said construction as said operating lever and between said operating lever and said front pivot bar, rigid means interconnecting the lift lever means at the same side of said construction to provide swinging movement of each of said rear lift lever means equal to that of the front lift lever means to which it is connected, said operating lever having a portion manually deflectable independently of its pivot about said transverse horizontal axis, and latch means comprising a first latch element comprising a plate portion having a series of latch pin receiving openings and a second latch element comprising pin receivable in one of said openings, one of said elements being carried by said operating lever.

33. A construction as defined in claim 32, in which said rear pivot bar is rotatable about its axis and in which said rear lift lever means are fixed to said rear pivot bar.

34. A construction as defined in claim 32, in which said rigid means interconnecting front and rear lift lever means comprises links pivoted to said lift lever means at points spaced from the pivot connections between said lift lever means and said seat support members.

35. A construction as defined in claim 34, in which said operating lever is pivoted to an intermediate portion of one of said links.

36. A construction as defined in claim 35, in which said plate portion is part of one of said front lift lever means and said pin is fixed to said operating lever.

37. A construction as defined in claim 34, in which the connections between said operating lever and said front lift lever means comprises a pin and slot connection therebetween.

38. A construction as defined in claim 32, in which said operating lever is fixed to said front pivot bar.

39. A construction as defined in claim 34, in which said operating lever is fixed to said front pivot bar.

40. A construction as defined in claim 39, in which the said plate portion is part of one of said links.

41. A construction as defined in claim 38, in which the connection between said operating lever and said front lift lever comprises said front pivot bar.

* * * * *